United States Patent
Holecek et al.

(10) Patent No.: US 6,169,519 B1
(45) Date of Patent: Jan. 2, 2001

(54) TCAS BEARING MEASUREMENT RECEIVER APPARATUS WITH PHASE ERROR COMPENSATION METHOD

(75) Inventors: Charles L. Holecek, Marion, IA (US); Constantinos S. Kyriakos, Indian Harbour Beach; Sami R. Wahab, Melbourne, both of FL (US)

(73) Assignee: Rockwell Collins, Inc., Cedar Rapids, IA (US)

( * ) Notice: Under 35 U.S.C. 154(b), the term of this patent shall be extended for 0 days.

(21) Appl. No.: 09/399,677

(22) Filed: Sep. 21, 1999

(51) Int. Cl.[7] ........................................................ G01S 5/04
(52) U.S. Cl. ............................ 342/442; 342/444; 342/445
(58) Field of Search .................................... 342/463, 465, 342/442, 445, 444

(56) References Cited

U.S. PATENT DOCUMENTS

| | | | |
|---|---|---|---|
| 4,639,733 | * 1/1987 | King et al. | 342/424 |
| 4,809,012 | * 2/1989 | Tong | 343/853 |
| 4,855,748 | 8/1989 | Brandao et al. | 342/455 |
| 4,899,157 | 2/1990 | Sanford et al. | 342/40 |
| 5,008,844 | 4/1991 | Kyriakos et al. | 364/571 |
| 5,122,808 | 6/1992 | Kyriakos | 342/442 |
| 5,227,803 | * 7/1993 | O'Connor et al. | 342/442 |
| 5,589,838 | * 12/1996 | McEwan | 342/387 |
| 5,657,027 | * 8/1997 | Guymon, II | 342/445 |

* cited by examiner

*Primary Examiner*—Thomas H. Tarcza
*Assistant Examiner*—Dao L. Phan
(74) *Attorney, Agent, or Firm*—Nathan O. Jensen; Kyle Eppele; J. P. O'Shaughnessy

(57) ABSTRACT

A TCAS receiver, including a relative bearing measurement radio receiving apparatus for use with an antenna array having four antennas where each antenna has associated with it, its own receiver capable of demodulating both I and Q components of transmissions from an intruding aircraft.

19 Claims, 2 Drawing Sheets

TCAS BEARING MEASUREMENT RECEIVER APPARATUS WITH PHASE ERROR COMPENSATION METHOD

BACKGROUND OF THE INVENTION

This invention relates to a direction finding antenna system. More specifically, it relates to a receiver system in a Traffic/Alert Collision Avoidance System (TCAS) which is particularly suited for determining the bearing of a target aircraft relative to a protected aircraft and methods of operation.

The TCAS equipment located aboard a protected aircraft periodically transmits interrogation signals which are received by transponders located aboard other aircraft, hereinafter referred to as target aircraft, in the vicinity of the protected aircraft. Mode S altitude reporting transponders are preferred so that TCAS capabilities can be fully exploited. In reply to the interrogation signals, the target aircraft's transponder transmits a response signal. The TCAS equipment aboard the protected aircraft determines the range of the target aircraft in accordance with the round trip time between transmission of the interrogation signal and receipt of the response signal. Relative bearing to the target aircraft is determined from differences in the time to different elements in the TCAS antenna. In addition, if the target aircraft is equipped with a Mode C or Mode S transponder, the protected aircraft can determine the altitude of the target aircraft from the content of the response signal.

Information in the response signal, as well as information derived from the response signal, is used by the TCAS equipment to determine whether there is a threat of collision between the protected aircraft and the target aircraft. The response from each target aircraft is processed individually to determine the degree of threat and then, if necessary, an appropriate advisory is issued by the TCAS equipment to the pilots of the protected aircraft to minimize the degree of threat.

Relative bearing to the target aircraft may be determined from the response signal by a multi-element antenna array, for example, by a four-element antenna array and an associated receiver system. Typically, a TCAS antenna consists of an array of four vertically polarized elements. The elements are preferably spaced equally about the circumference of the antenna array, that is geometrically at 90° intervals. A first pair of elements, therefore, is aligned on an axis which is perpendicular to an axis on which the second pair of elements are aligned. Adjacent elements are those which are circumferentially spaced apart by 90° geometrically. Opposite elements are those which are circumferentially spaced apart by 180° geometrically.

Conventionally, the relative bearing to the target aircraft is determined by measuring the phase difference of the response signal between opposite element pairs. If both pairs of opposite elements are used, for example, then the phase difference between one opposite element pair is $K \sin(\beta)$ and the phase difference between the other opposite element pair is $K \cos(\beta)$, where K is the maximum phase excursion of the response signal between the elements in the respective opposite pair, and $\beta$ is the angle of the target signal incidence with respect to the axes connecting antenna elements within an element pair. The actual relative bearing is then calculated as follows:

$$\beta = \tan^{-1}(K \sin(\beta)/K \cos(\beta))$$

Such a system functions properly as long as K is less than 180° electrical degree in space at the operating frequency. K is related to element spacing. When K is greater than or equal to 180°, an ambiguity exists as phase detectors in the receive system are unable to properly distinguish phase differences. In such cases, for example, the phase detector cannot differentiate between measured phase differences of 180° and −180°. Under these circumstances, the relative bearing to the intruder aircraft cannot be determined with certainty. This ambiguity conflicts with a desire to utilize an antenna which has the greatest phase excursion between opposite elements (i.e. large element spacing) in order to maximize the signal to noise ratio of the system.

Also, in a phase only measurement system, the phase error of the measurement means cannot be ignored. For example, some of the receive system induced phase errors cannot be corrected by factory calibration of system equipment since phase variations occur in the system components with varying temperature, age and other variables.

Several methods of addressing these phase errors have been proposed in the past. U.S. Pat. No. 5,122,808 issued on Jun. 18, 1992, to Constantinos S. Kyriakos entitled "PHASE ONLY BEARING MEASUREMENT WITH AMBIGUITY CORRECTION IN A COLLISION AVOIDANCE SYSTEM", is one of such methods.

While this approach has enjoyed considerable use in recent years, it has several drawbacks. One drawback with this approach is its inability to determine the bearing of an intruding aircraft without receipt of at least two or more transmissions from the intruding aircraft.

In prior TCAS bearing implementations using phase measuring techniques, two or more transmissions were often necessary before a bearing value could be computed. Between the transmissions, hardware reconfigurations were required that could introduce errors that could result in errors in relative bearing calculations.

When more than one transmission is required to obtain the data needed to calculate the relative bearing, target data points in one transmission must be paired up with corresponding target data points, target for target. Any error in pairing could result in considerable error in bearing calculations. One method of reducing the probability of incorrect pairing is to implement digital filtering that operates on several transmissions, but this further extends the time delay before valid relative bearing can be determined.

Within a TCAS system, interrogations often occur at the rate of 1 per second. In prior inventions, relative bearing determination is often made after two or more interrogations. Thus, bearing update is often after a delay on the order of a few seconds. Each message transmission from a transponder unit is typically 64 uSec or 120 uSec in length, and is made up of several pulses that are typically 0.5 uSec each in duration.

Consequently, there exists a need for improved receiver systems for measuring the bearing of an intruder aircraft.

SUMMARY OF THE INVENTION

It is an object of the present invention to provide for an improvement in bearing determinations of an intruding aircraft.

It is a feature of the present invention to include a four-element antenna array where each antenna element in the array has associated with it, its own receiver.

It is an advantage of the present invention to provide for bearing determination without the need for "swap switches" which have been common in prior art TCAS receiver systems.

It is another object of the present invention to provide for bearing determinations of intruding aircraft with the reception of a single transmission from the intruding aircraft.

It is another feature of the present invention to include receivers dedicated to the antenna elements where each receiver is capable of reception and demodulation of both in-phase (I) and quadrature (Q) components of transmissions incident thereon from an intruding aircraft.

It is another advantage of the present invention to eliminate the need for receiving multiple transmissions from an intruding aircraft before a bearing calculation can be made.

It is an objective to make all four I and all four Q measurements at the same time to avoid errors that can be introduced when only two I and two Q measurements are made at one time and the other two I and two Q measurements are taken at another time, possibly with hardware reconfigurations that can introduce errors.

The present invention is a method and apparatus for determining the relative bearing of an intruding aircraft which is designed to satisfy the aforementioned needs, provide the previously stated objects, include the above-listed features and achieve the already articulated advantages. The present invention is carried on in a "multiple reception-less" system, in the sense that the requirement to receive multiple transmissions from an intruding aircraft before making a bearing determination of such intruding aircraft is eliminated.

The present implementation reduces the time delay required to determine relative bearing.

With the present invention, relative bearing determination can be made during a reception with only a delay on the order of microseconds. That is, all of the data to provide a full accuracy bearing determination is obtainable from one reception of one pulse.

The present invention is capable of acquiring all the data needed to determine relative bearing to full accuracy on one of the 0.5 uSec pulses including the first one. Delay in the digital processing of the data may be a few milliseconds using the digital processing of present day computers resulting in a much shorter delay time to provide an accurate relative bearing measurement output.

Because the four phase detectors are in effect connected around the circle of the antenna array, and because I and Q measurements are taken essentially simultaneously, the phase measurement system is a closed-system. This causes cancellation in certain errors. For example, differences in phase of mutual coupling of opposite elements pairs cancels. That is, an antenna array that is not square, but moderately "diamond" in shape, may be used in the system without introducing significant bearing errors.

The closed-system resulting from the loop connection of phase detectors allows for considerable variation in antennas from one to another without significantly affecting the accuracy of the system in measuring bearing. For example, the array radius (element spacing) can be changed considerably and the auto calibration algorithm will properly calibrate the system. Thus, TCAS antennas from different manufacturers will function in the system even though they may have considerably different design parameters. Software lookup antenna compensation tables are not required to meet the bearing accuracy required for TCAS bearing output.

Accordingly, the present invention is a relative bearing measurement radio receiving apparatus for use with an antenna array having four antennas where each antenna has associated with it, its own receiver capable of demodulating both I and Q components of transmissions from an intruding aircraft.

BRIEF DESCRIPTION OF THE DRAWINGS

The invention may be more fully understood by reading the following description of preferred embodiments of the invention, in conjunction with the appended drawings wherein.

DESCRIPTION OF THE PREFERRED EMBODIMENT

Figure 1:
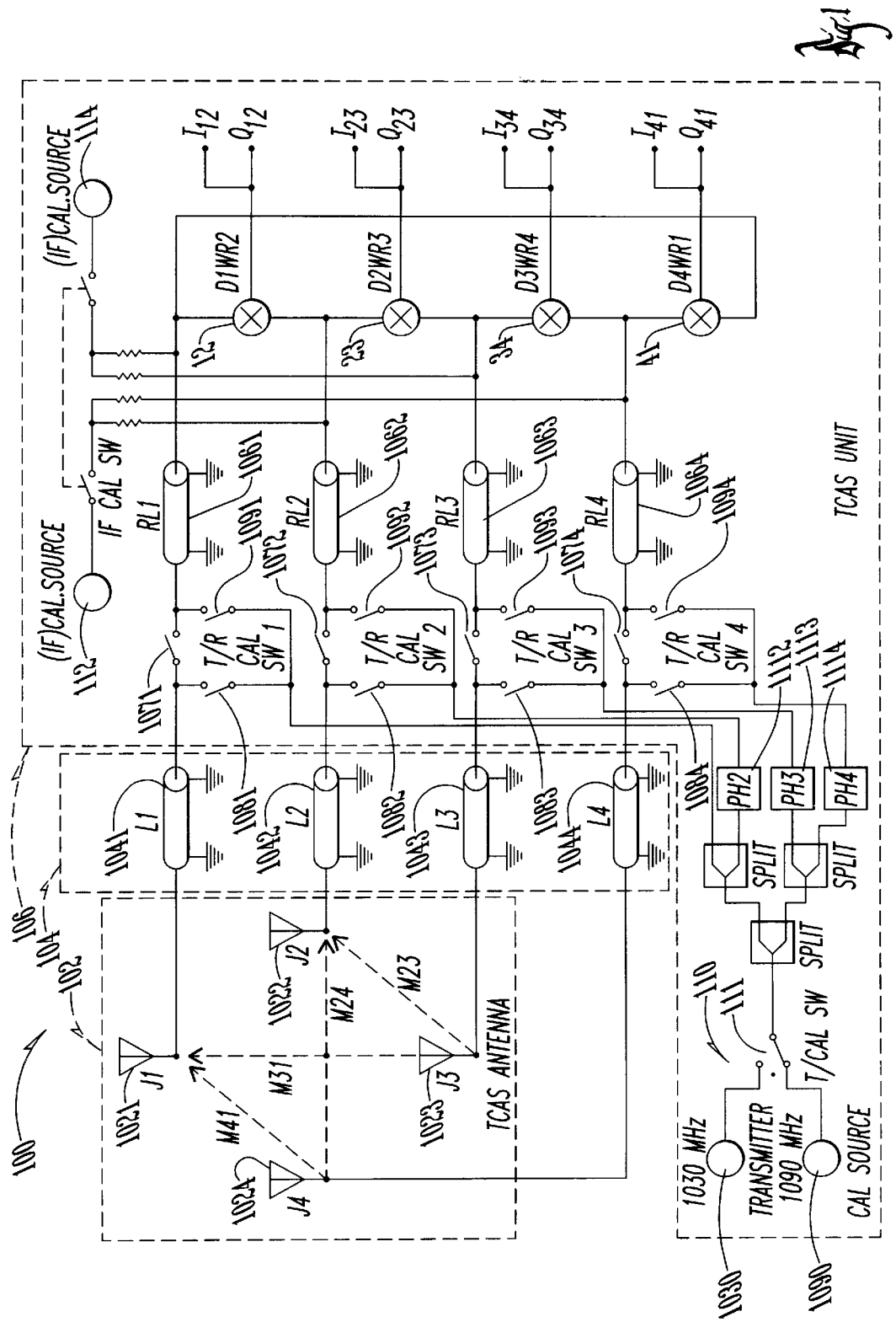
FIG. 1 is a block diagram of a receiver apparatus and antenna combination of the present invention.

Now referring to the drawings, wherein like numerals refer to like matter throughout, and more particularly to FIG. 1, there is shown a highly simplified TCAS receiver/antenna combination, generally designated 100, having a multi-element antenna array 102 which includes antennas 1021, 1022, 1023, and 1024. These antennas may be arranged in a circular pattern with the antennas being separated by an angular distance of 90° geometrically. Antennas 1021, 1022, 1023, and 1024 are designed to receive signals from transponders on board intruding aircraft and to transmit interrogations to transponders. These antennas and others similar to them have been used extensively in the past and are generally well known. The orientation and element spacing of this array of elements can be varied depending upon particular requirements of a system.

The set of antenna elements can be oriented with any angular orientation with the offset referenced to the basic square orientation. The angular offset set from the basic square orientation can be removed in the digital processing. Increasing the element spacing will increase the accuracy with which the bearing can be estimated. But increasing the element spacing creates ambiguities that must be removed to obtain proper calculation of the bearing. Typically, the element spacing will be less than 180 electrical degrees in space between adjacent elements, at the operating frequencies of 1030 MHz or 1090 MHz.

Also shown in FIG. 1 is a TCAS bearing receiver system generally designated 106 having receivers 1061, 1062, 1063, and 1064 disposed therein. Disposed between antenna 102 and receiver system 106 is a plurality of connection lines 104. Connection lines 104 include individual connecting lines 1041, 1042, 1043, and 1044, which connect the antenna/receiver pairs 1021 and 1061, 1022 and 1062, 1023 and 1063, and 1024 and 1064. Connecting lines 104 should be understood to include all transmission paths between the antenna 102 and the receiver 106 which would include connecting cables, their associated connectors, and signal paths on any circuit cards associated with the system 100 which are disposed between antenna 102 and receiver 106.

Receiver 106 includes radio frequency sources 110. Source 110 may be used to calibrate the phase errors in the system 100. Source 110 includes transmitter source 1030 and calibration source 1090 which through switch 111 are selectively coupled with antennas 1021, 1022, 1023, and 1024 through switches 1081, 1082, 1083, and 1084 respectively. For receiver calibration, the receiver calibration source 1090 is selected. For normal transmit, the transmitter 1030 source is selected. Receivers 1061, 1062, 1063, and 1064 are selectively coupled to antennas 1021, 1022, 1023, and 1024 respectively. Receivers 1061, 1062, 1063, and 1064 may be any type of known receiver architecture which is capable of receiving and demodulating both I and Q components of any received signal. Receiver 106 includes intermediate frequency (IF) calibration sources 112 and 114, which may be local oscillators operating at predetermined frequencies. Disposed between receiver 1061 and 1062 is phase detector 12. Disposed between receiver 1062 and 1063 is phase detector 23. Disposed between receiver 1063 and 1064 is phase detector 34. Disposed between receiver 1064 and 1061 is phase detector 41. Phase detectors 12, 23, 34, and 41 are used to measure the relative phase between the outputs of the receivers 1061, 1062, 1063, and 1064 for both their I and Q components. Phase detectors 12, 23, 34, and 41 may be accomplished using various different types of devices; typical circuits that might be used as phase detectors include double balanced diode mixers and Gilbert cell integrated circuit mixers. Phase detector 12 provides an output $I_{12}$ and $Q_{12}$. Similarly, phase detector 23 provides an 123 output and a $Q_{23}$ output. Phase detectors 34 and 41 provide $I_{34}$ and $Q_{34}$ and $I_{41}$ and $Q_{41}$ outputs respectively. Frequency conversion to the typical IF frequency of 60 MHz, while present, is not shown in simplified diagram FIG. 1.

Figure 2:
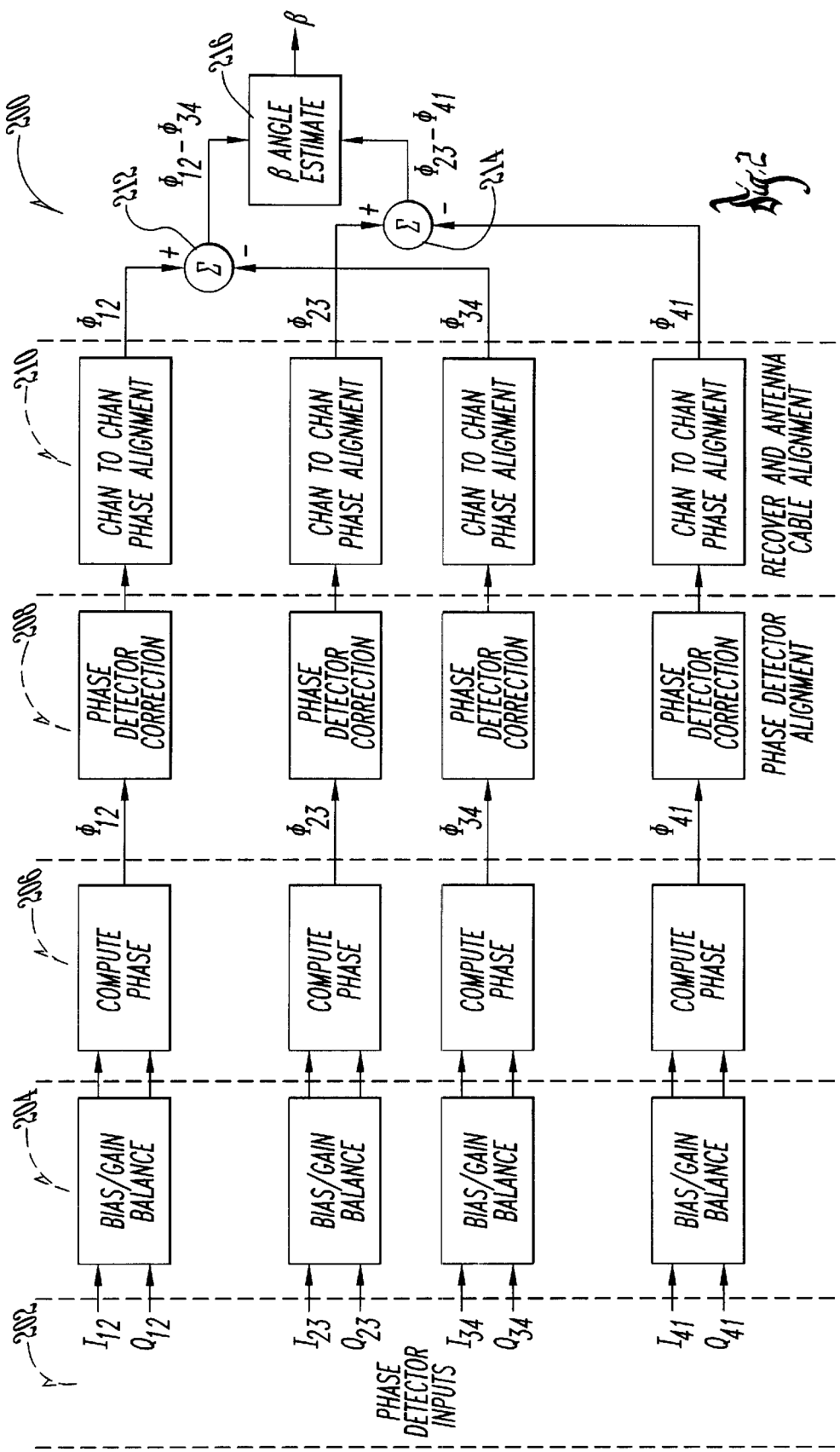
FIG. 2 is a signal flow diagram, of the method of the present invention, used to calculate bearing of an intruding aircraft.

Now referring to FIGS. 1 and 2, there is pictorially shown a signal flow diagram 200 of the process of bearing determination for the present invention which shows phase detector inputs 202, which are output from phase detectors 12, 23, 34, and 41 of FIG. 1. The signals 202 are first processed through the step 204, which makes corrections for bias and gain balancing. This first step 204 may be preceded by an analog to digital conversion. Once step 204 is completed, the following step 206 computes the raw phase difference between the compared receiver adjacent channels. This computed raw phase difference includes phase errors therein which could come from several sources, including errors in the phase detectors themselves and errors relating to transmission path differences between the channels also referred to at times as phase alignment or receiver and antenna cable alignment. Computed raw phase differences is then processed through step 208, which is designed to correct for phase errors resulting from characteristics of the phase detectors. Then in step 210, errors associated with transmission path link differences between the compared transmission paths are corrected. A corrected phase signal is then output for each of the four receiver comparisons. The outputs of the various steps 210 are combined through summer 212 and summer 214 and ultimately an angle of arrival of the incident transmission from an intruding aircraft β is determined through step 216. β is the relative bearing of the intruding aircraft. Summer 212 and 214 compute the differences.

In the normal operational mode, the processing of the signals from the four receivers 1061, 1062, 1063, and 1064 of FIG. 1 is done in parallel and may be accomplished from a single transmission from an intruding aircraft.

A more detailed review of the steps 204, 206, 208, and 210 follows. The step 204 bias correction and gain adjustment can be accomplished in various ways, using techniques well known in the art. One way of approaching this step may be to consider the following relationships:

$$IBias=\Sigma IData(n)/N, \quad QBias=\Sigma QData(n)/N.$$

This is the bias offset that is subtracted as a bias correction such that the resulting bias offset is 0.

$$\text{I to Q Gain ratio}=\Sigma[IData(n)-IBias]/\Sigma(QData(n)-Qbias]$$

where n=one sample of I or Q data, N=number of samples in one cycle, where one cycle is from the approximately 50 kHz beat note between the 50.975 MHz and 60.025 MHz oscillators. Gain ratio between I and Q of the I and Q pairs is then scaled to 1 in the gain correction process.

Mathematically, the gain adjustment calculation is the sum of the ratios rather than ratios of the sum. The sum of ratios is used to produce an averaged estimate of the gain difference between the I and Q channels.

$$\text{I to Q Gain ratio}=SUM[(Idata(n)-Ibias)/(Qdata(n)-Qbias)]$$

for one cycle of I or Q data.

During this calibration process, one cycle of each phase detector is sampled into separate buffers so that each buffer starts at 0 degrees of 1 and 0 degrees of Q. The gain difference is then used to perform the gain correction.

The bias offset and gain correction relationships may be facilitated by the use of two oscillators 112 and 114 (FIG. 1) which may be turned on to create a 50 kHz beat note at all four I/Q phase detectors. Sweeping the phase detectors 12, 23, 34, and 41 in this manner allows the offset of each I and Q channel to be removed and the gain of each pair of I and Q to be set equal.

This is done with the phase detector being swept with the 59.975 MHz and 60.025 MHz oscillators. The 50 kHz beat note was chosen as a compromise to both minimize errors associated with short term and long term drift of the oscillators, while allowing enough sampling resolution to achieve a high degree of correction accuracy. The beat frequency is not a critical issue. There is a wide range of beat frequencies that could have been chosen that would result in proper performance. Low beat frequencies would require excessive time to sample a full cycle of the beat frequency while possibly introduce errors from oscillator drift.

After bias offset and compensation, the arc tangent of the ratio of each I/Q pair is computed at block 206. Once the uncorrected computed phase at block 206 is generated, the next step is to correct for phase detector response or linearity errors in accordance with step 208. Any method of correcting for phase errors due to the phase detectors 12, 23, 34, and 41 themselves could be utilized.

Because the phase detectors do not output perfect sine and cosine waves when swept, a phase detector linearity compensation must be made. This is accomplished at block 208 in FIG. 2. Since the phase detectors are sampled at constant intervals, the output of each Arctan process should be a linear slope from 0 to 360°. That is, if the phase detectors were perfect and output sine and cosine waves, the output would be a constant slope. Any differential from the constant slope is then the correction needed for each Arctan result.

To perform the phase detector correction for phase detector linearity, 208, oscillators 112 and 114 are turned on. Oscillators 112 and 114, when turned on, generate phase signals at the I/Q phase detector outputs which sweep the detectors with a constant rate of change (nominal 50 kHz). Characterizing the phase error in the phase detectors may be accomplished by analyzing the error between the actual phase detector response relative to an ideal response. One method of doing this is to use the zero degree crossing of the 50 kHz beat note to synchronize the actual phase curve with the ideal curve, store the error (actual minus ideal) from 0 to 360 degrees (one cycle of the beat note), perform inverse interpolation on the error data such that the error data may be indexed using the uncorrected phase, and performing averaging on the error curves to lessen the affects of phase discontinuities in the raw measurements.

The hardware following the I and Q detectors consists of an analog to digital converters on each I and each Q channel output from the receivers with the resulting numerical digitized values operated on by a digital signal processor computer. This signal processor consists of the typical components of the CPU (Central Processor Unit) random access memory (RAM) and the program memory in read only memory (ROM).

Computing the raw phase between adjacent elements is a digital operation. Software techniques apply in this case. To compute raw phase between adjacent elements perform the following for each adjacent element pair.

$$\phi_{12}(n)=UNWRAP(ARCTAN(I(n)/Q(n)))$$

Where (I(n) and Q(n) are gain and bias balanced and the UNWRAP function takes the {-90, 90} degree ARCTAN result in conjunction with the signs of I(n) and Q(n) to produce a phase sample which is unambiguous from {0, 360} degrees. This approach provides a concise result and avoids the use of a phase correction table. NOTE: The unwrap function is well known in the art, including a definition such as:

UNWRAP (P) unwraps radian phases P by changing absolute jumps greater than pi to their 2 *pi complement. It unwraps along the first non-singleton dimension of P. P can be a scalar, vector, matrix, or N-D array.

A well-known software package, "Mathlab", could be used, but others could be used as well. This approach provides a concise result and avoids the use of a phase correction table.

Since I(n) can be related to a sine function and Q(n) to a cosine function because of quadrature, the division results in a tan function since tan=sine/cosine. The fundamental concept is that of performing the arctan while preserving the quadrant information. This is similar to the ATAN2 function employed in several software programs.

Once the corrections are made for the phase detector errors, then the channel-to-channel phase offset or phase misalignment corrections are made in accordance with step 210. This phase offset is due to pair-to-pair time delay differentials in the sum of the antenna feed line coaxial delays plus the internal receiver channel time delays. Time delays result in corresponding phase shifts. Various methods of performing phase correction could be applied. One method of performing step misalignment 210 is as follows:

The following determines the difference in time delay from an antenna element to a corresponding phase detector in relation to the delay from an adjacent antenna element to the same phase detector.

Assume the antenna is symmetrical with equal element-to-element spacing and that the two opposite-to-opposite spacings are equal.

Step 1. Transmitter/receiver/calibration switches 1071–1074 and 1081–1084 are set so antenna element 1024 transmits a calibration signal at 1090 MHz to antenna elements 1021 and 1022. Assume the special case where L1=L2=L3=L4 where L1, L2, L3, and L4 are the cable lengths for cables 1041–1044 respectively. Additionally, assume that the four receivers 1061–1064 have identical phase delays (can also be described as time delays) therein which are denoted as RL1, RL2, RL3, and RL4 respectively. Also assume that for this special case, the difference in transmission paths between opposite and adjacent elements of the antenna is 60 electrical degrees for signals at 1090 MHz.

Step 2. Read the output of phase detector 12.

Step 3. With the switches set for antenna element 1024 to transmit to antenna elements 1021 and 1022, then phase detector 12 will read −60°.

Step 4. Switch the transmitter/receiver/calibration switches so that antenna element 1024 is off and element 1023 is now transmitting.

Step 5. Read the output of phase detector 12 which will be +60° in the example.

Step 6. Determine the average of readings. The difference (L1+RL1)−(L2+RL2) is then the average of the two readings at the phase detector 12 which in this special case is 0°.

Step 7. Now assume that the same procedure is repeated except that L1 is 20° longer than L2 at 1090 MHz and RL1 is 10° longer than RL2 at 1090 MHz. With antenna element 1024 transmitting, phase detector 12 would have a reading of −30°. Then switching to transmitting from antenna element 1023 with antenna element 1024 off, the reading on phase detector 12 would be +90°. The average of these phase readings is +30°, and this corresponds to (L1+RL1)−(L2+RL2).

Step 8. This average is used as a phase reference point for receptions on antenna element 1021 with respect to receptions on antenna element 1022. This +30° reading is the same that would be produced if a calibration element were located at the very center of the antenna array and driven at 1090 MHz. This 30° bias is removed by digital signal processing carried on in step 210 of the angle of arrival computation shown in FIG. 2.

$$\beta = AOA: = \frac{180}{\pi} \cdot atan\left[\frac{(\Phi23-\Psi23)-(\Phi41-\Psi41)}{(\Phi12-\Psi12)-(\Phi34-\Psi34)}\right] \quad \text{(Equation 1)}$$

Where, Φ is phase detector corrected angle and Ψ is phase detector center.

Regrouping $$\beta = AOA: = \frac{180}{\pi} \cdot atan\left[\frac{(\Phi23-\Phi41)-SinOffset}{(\Phi12-\Phi34)-CosOffset}\right] \quad \text{(Equation 2)}$$

where, SinOffset :=Ψ41−Ψ23 CosOffset :=Ψ34−Ψ12

The estimate of the angle of aircraft of β in step 216 is then calculated using well-known techniques, such as the following:

Refer to FIG. 1 Looking at J1-J2 cable pair $$\Psi12_A:=(M_{31}+L_1+RL_1)-(M_{23}+L_2+RL_2)$$

$$\Psi12_B:=(M_{41}+L_1+RL_1)-(M_{42}+L_2+RL_2)$$

Assuming adjacent mutual coupling phases are equal gives, $$\Psi12:=\tfrac{1}{2}\cdot[(M_{31}-M_{42})+2\cdot[(L_1+RL_1)-(L_2-RL_2)]]$$

Looking at J3-J4 cable pair $$\Psi34_A:=(M_{31}+L_3+RL_3)-(M_{41}+L_4+RL_4)$$

$$\Psi34_B:=(M_{23}+L_3+RL_3)-(M_{42}+L_4+RL_4)$$

Assuming adjacent mutual coupling phases are equal gives, $$\Psi34:=\tfrac{1}{2}\cdot[(M_{31}-M_{42})+2\cdot[(L_3+RL_4)-(L_3-RL_4)]]$$

CosOffset :=Ψ34−Ψ12

$$CosOffset:=[(L_3+RL_3)-(L_4+RL_4)]-[(L_1+RL_1)-(L_2+RL_2)] \quad \text{(Equation 3)}$$

By symmetry, a similar equation results for SinOffset.

Equation 2 provides a comprehensive description of operation providing bearing information from all element pairs. CosOffset is obtainable from equation 3 and SinOffset is obtainable from a similar equation. The path phase differences, for example (L1+RL1)−(L2+RL2), which is needed to determine CosOffset in equation 3, are obtainable from the calibration process described earlier in relation to FIG. 1.

Once all of the path phase differences are determined, SinOffset and CosOffset can be determined, and equation 2 is then used to calculate corrected angle of arrival (AOA) or relative bearing. Once SinOffset and CosOffset are known, the system is switched from Calibration mode to normal bearing measurement mode. At that point, with SinOffset and CosOffset known, incoming reading from the four phase detectors are fed in this equation in the signal processor. The IBias and QBias offsets are applied to each corresponding phase detector reading as is the Gain corrections, and the phase detector linearity corrections, before application to the process of equation 2.

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described being a preferred or exemplary embodiment thereof.

We claim:

1. A receiver system for use in determining the relative bearing between a protected position and an intruding aircraft, the system comprising:
    an array of at least four antenna elements arranged around a circumference of a predetermined area, where each antenna element is for receiving transponder signals transmitted from a transponder located on an intruding aircraft;
    a group of at least four receivers, where each receiver of said group is coupled to one of said antenna elements; and,
    a network of at least four phase detectors where each phase detector is exclusively coupled to and comparing outputs from a pair of said receivers.

2. A receiver of claim 1 wherein each of said receivers demodulates both the in-phase and quadrature components of said transponder signals.

3. A receiver of claim 2 wherein each of said receivers is coupled to a group of one or more antenna elements which is exclusive of antenna elements coupled to another of said receivers.

4. A receiver system of claim 3 wherein said array is diamond shaped.

5. A receiver system of claim 4 wherein said array further having axes connecting the at least four antenna elements which are orthogonal.

6. A receiver of claim 5 wherein said axes have non-equal dimensions.

7. A receiver of claim 2 further including a calibration signal source.

8. A receiver of claim 7 wherein said calibration signal source is a switchable TCAS transmitter.

9. A receiver of claim 6 further including a calibration signal source.

10. A receiver of claim 9 wherein said calibration signal source is a switchable TCAS transmitter.

11. A receiver system for use in determining the relative bearing between a protected position and an intruding aircraft, the system comprising:
    first antenna means for capturing transponder signals transmitted from a transponder on an intruding aircraft;
    second antenna means for capturing transponder signals transmitted from a transponder on an intruding aircraft;
    third antenna means for capturing transponder signals transmitted from a transponder on an intruding aircraft;
    fourth antenna means for capturing transponder signals transmitted from a transponder on an intruding aircraft;
    said first antenna means, said second antenna means, said third antenna means, and said fourth antenna means arranged in a predetermined pattern, so that a phase difference will appear across at least two of said antenna means when receiving a transponder transmission;
    first receiver means for processing signals captured by one of said antenna means;
    second receiver means for processing signals captured by another of said antenna means;
    third receiver means for processing signals captured by another of said antenna means;
    fourth receiver means for processing signals captured by another of said antenna means; and,
    means for detecting phase differences in signals output by said first, second, third and fourth receiver means;
    wherein said first receiver means, said second receiver means, said third receiver means, and said fourth receiver means, each demodulate both an in-phase and quadrature component of said signal captured by one of said antenna means.

12. A receiver system of claim 11 wherein said predetermined pattern of said first, second, third, and fourth antenna means is a diamond-shaped array wherein axes connecting pairs of said antenna means are orthogonal and said axes have unequal dimensions.

13. A receiver system of claim 11 further including a means for generating a calibration signal.

14. A receiver system of claim 13 wherein said means for generating a calibration signal is a switchable TCAS transmitter.

15. A receiver system of claim 12 further including a means for generating a calibration signal.

16. A receiver system of claim 15 wherein said means for generating a calibration signal is a switchable TCAS transmitter.

17. A receiver system of claim 11 wherein said first, second, third, and fourth antenna means are arranged in a rectangular configuration.

18. A receiver system of claim 17 wherein said rectangular configuration is square.

19. A method of compensation for phase errors in a TCAS receiver comprising the steps of:
    providing a receiver having four antenna elements and four receivers, one for each antenna, wherein each receiver demodulates both I and Q components of received signals;
    transmitting a calibration signal from a fourth of said antenna elements to first and second elements;
    recording a first output of a phase detector across said first and second antenna elements;
    switching the transmitting of said calibration signal from the first and second antenna elements to a third element;
    recording a second output of said phase detector;
    determining an average of said first and said second outputs;
    using said average for a phase reference point of signals on said second antenna.

* * * * *